United States Patent
Haruna et al.

(10) Patent No.: US 7,202,612 B2
(45) Date of Patent: Apr. 10, 2007

(54) DISCHARGE LAMP LIGHTING APPARATUS

(75) Inventors: Fumio Haruna, Yokohama (JP);
Masaru Shimizu, Chigasaki (JP);
Kouji Kitou, Hiratsuka (JP);
Tetsunosuke Nakamura, Yokohama (JP)

(73) Assignees: Hitachi, Ltd., Tokyo (JP); Hitachi Media Electronics Co., Ltd., Mizusawa-shi (JP)

( * ) Notice: Subject to any disclaimer, the term of this patent is extended or adjusted under 35 U.S.C. 154(b) by 0 days.

(21) Appl. No.: 11/318,563

(22) Filed: Dec. 28, 2005

(65) Prior Publication Data

US 2006/0097665 A1  May 11, 2006

Related U.S. Application Data

(63) Continuation of application No. 10/860,072, filed on Jun. 4, 2004, now Pat. No. 6,930,380, and a continuation of application No. 10/835,064, filed on Apr. 30, 2004, now Pat. No. 7,023,146.

(30) Foreign Application Priority Data

Sep. 29, 2003  (JP)  ............................. 2003-336693

(51) Int. Cl.
*G05F 1/00*  (2006.01)

(52) U.S. Cl. ...................... 315/308; 315/291

(58) Field of Classification Search ........ 315/307–308, 315/224–225, 219, 244, 276, 291, 209 R
See application file for complete search history.

(56) References Cited

U.S. PATENT DOCUMENTS

| 5,828,177 | A | 10/1998 | Toda et al. |
| 5,910,712 | A | 6/1999 | Toyama |
| 6,100,642 | A | 8/2000 | Kim |
| 6,127,789 | A * | 10/2000 | Ishizuka et al. ............ 315/308 |
| 6,333,607 | B1 | 12/2001 | Yamamoto et al. |
| 6,351,081 | B1 * | 2/2002 | Hwang ...................... 315/224 |
| 6,429,603 | B1 * | 8/2002 | Tsugita et al. .............. 315/224 |
| 6,515,436 | B2 * | 2/2003 | Kobayashi et al. ......... 315/307 |
| 6,853,155 | B2 * | 2/2005 | Yamamoto et al. ......... 315/291 |
| 2002/0047644 | A1 * | 4/2002 | Ito et al. .................... 315/308 |

FOREIGN PATENT DOCUMENTS

| JP | 05-074583 | 3/1993 |
| JP | 08-008076 | 1/1996 |

* cited by examiner

*Primary Examiner*—Thuy V. Tran
*Assistant Examiner*—Tung Le
(74) *Attorney, Agent, or Firm*—Antonelli, Terry, Stout & Kraus, LLP.

(57) ABSTRACT

A discharge lamp lighting apparatus has a problem that a microcomputer within the apparatus falls down into malfunction due to noises generated in an inside thereof. With such the structure of the discharge lamp lighting apparatus that an operation of a calculation processing circuit, which is built up with the microcomputer, etc., is stopped through stopping the supply of electric power to the calculation processing circuit or bringing it into a sleep mode, it is possible to protecting it from the malfunction, during a time period when high voltage is generated just after starting of lighting of the discharge lamp. Also, with applying a protection processing by means of the calculation processing circuit and also applying an analog protection circuit, in common with, thereby it is possible to ensure reliability thereof further.

15 Claims, 10 Drawing Sheets

DISCHARGE LAMP LIGHTING APPARATUS

CROSS-REFERENCE TO RELATED APPLICATION

This application is a continuation of Ser. No. 10/835,064 filed Apr. 30, 2004 and U.S. Pat. No. 7,023,146.

This application is a Continuation of application Ser. No. 10/860,072, filed Jun. 4, 2004, U.S. Pat. No. 6,930,380 the entire disclosure of which is hereby incorporated by reference.

BACKGROUND OF THE INVENTION

The present invention relates to a discharge lamp lighting apparatus of a projection-type display, such as, a liquid crystal projector or the like.

As a light source for a projection-type display, such as, a liquid crystal projector or the like, is adopted a high-pressure discharge lamp, such as, a metal halide lamp or a high-pressure mercury lamp, etc., for example, due to the reasons that it has high conversion efficiency and a point-like light source can be obtained, easily from it.

For the purpose of lighting the high-pressure discharge lamp, a discharge lamp is applied for the exclusive use thereof, which supplies voltage and current thereto necessary for the lighting.

Further in recent years, as was described in Japanese Patent Laying-Open No. Hei 5-74583 (1993) and Japanese Patent Laying-Open No. Hei 8-8076 (1996), for example, there is proposed a method for controlling the discharge lamp lighting apparatus with using a microcomputer, in the discharge lamp lighting apparatus.

BRIEF SUMMARY OF THE INVENTION

However, due to noises generated within the discharge lamp lighting apparatus, there is possibility that the microcomputer causes malfunction thereof.

Although the Japanese Patent Laying-Open No. Hei 5-74583 (1993) mentioned above discloses therein an inventive idea of calculating out a consuming electric power with using the microcomputer, thereby keeping the electric power constant, however no consideration is paid upon such malfunction of the microcomputer due to the noises generated therein. On the other hand, the Japanese Patent Laying-Open No. Hei 8-8076 (1996) mentioned above discloses therein an inventive idea of continuing the lighting of the lamp even in the case where the microcomputer causes the malfunction thereof, however there is still a problem that it is impossible to protect the microcomputer from causing or falling into the malfunction due to such the noises generated therein.

Accordingly, for dissolving such the problems mentioned above, according to the present invention, an object of the present invention is to provide a structure for protecting the microcomputer (i.e., a calculation processing circuit) from the malfunction due to the high-voltage generation noises, by stopping an electric power supply to the microcomputer during the time period when the high-voltages is generated before and after starting of lighting of the discharge lamp, i.e., where an ill influences of the noises is at the most.

As an effect of the present invention, it is possible to provide a discharge lamp lighting apparatus, being improved in reliability thereof.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE INVENTION

Hereinafter, embodiments according to the present invention will be fully explained by referring to the attached drawings.

<Embodiment 1>

Figure 1:
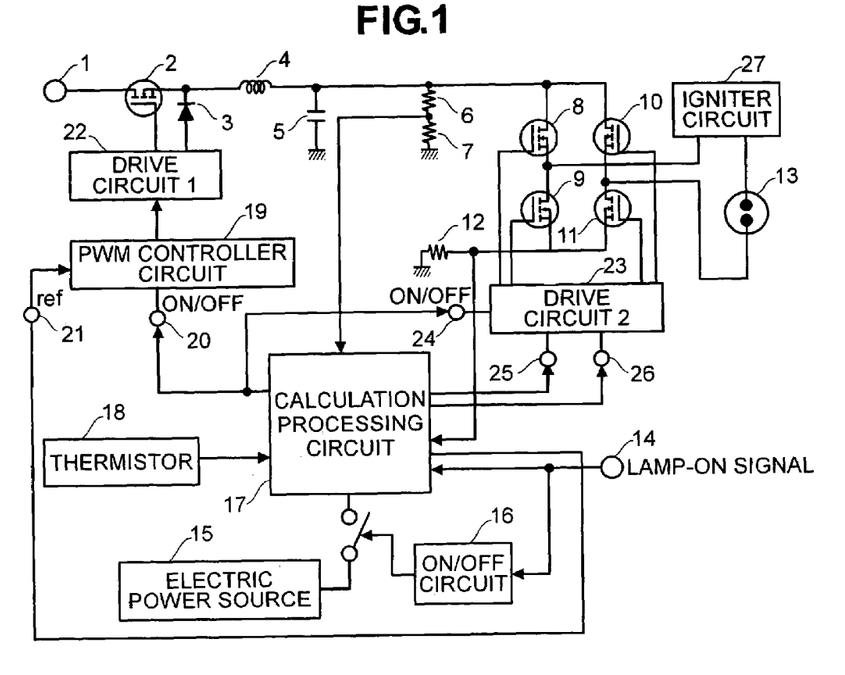
FIG. 1 is a block diagram for showing a first embodiment of the discharge lamp lighting apparatus, according to the present invention.

FIG. 1 is a block diagram of the first embodiment of the discharge lamp lighting apparatus, according to the present invention.

Figure 10:
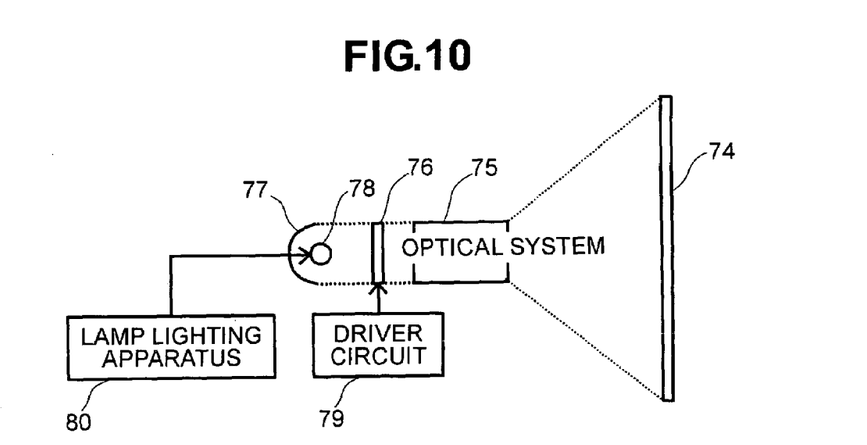
FIG. 10 is a block diagram of a projector, into which the discharge lamp lighting apparatus according to the present invention.

The discharge lamp lighting apparatus is applied into, such as, a projection-type display shown in FIG. 10 attached, for example.

In this FIG. 10, a reflector 77 and a high-pressure discharge lamp 78 builds up a light source for irradiating a light from a rear surface of a picture display device 76. The light penetrating through the picture display device 76 is projected onto a screen 74 by means of an optical system 75. The picture display device 76, being made up with a liquid crystal display device, for example, is driven through a picture display device driver circuit 79, therefore a picture of a large-scaled screen can be obtained on the screen 74. The discharge lamp lighting apparatus 80 conducts a starting and a lighting control of the high-pressure discharge lamp 78.

In FIG. 1, a reference numeral 1 depicts an input terminal of a main electric power source, 2 a MOS-FET, 3 a diode, 4 a choke coil, 5 a capacitor, 6 and 7 resistors, 8, 9, 10 and 11 MOS-FETs, 12 a resistor, 13 a discharge lamp, 14 a lamp-ON input terminal, 15 an electric power source for a calculation processing circuit, 16 an ON/OFF circuit for the calculation processing circuit, 17 a calculation processing circuit, 18 a thermistor, 19 a PWM controller circuit, 20 an input terminal of an ON/OFF signal for the PWM controller circuit 19, 21 an input terminal of a control voltage for the PWM controller circuit, 22 a drive circuit 1, 23 a drive circuit 2, 24 an input terminal of an ON/OFF signal for the drive circuit 23, 25 an input terminal of the drive circuit 23, 26 an input terminal 2 of the drive circuit 23, and 27 is a igniter circuit.

The MOS-FET 2, the diode 3, the choke coil 4, the capacitor 5, the resistors 6, 7, and 12, the drive circuit 22, and the PWM controller circuit 19 build up an electric power controller circuit. The MOS-FETs 8, 9, 10 and 11, and the driver 23 build up a current converter circuit. The igniter circuit 27 generates a high-voltage pulse, thereby starting the high-pressure discharge lamp 13. The calculation processing circuit 17, being built up with a microcomputer, for example, detects an output voltage through voltages divided by the resistors 6 and 7, and detects an output current through voltage generating across the resistor 12, and further it watches or supervises temperature of the discharge lamp lighting circuit by means of the thermistor 18. Also, the calculation processing circuit 17 produces a signal for driving the drive circuit 23 mentioned above, upon receipt of an input from the lamp-ON input terminal 14, thereby providing outputs to the input terminals 25 and 26 of the drive circuit 23. It also calculates out an output electric power, upon the basis of a result of the output voltage detection and a result of the output current detection mentioned above, thereby providing a restriction or limit voltage to the control voltage input terminal 21 of the PMW controller circuit 19 motioned above, so that it controls the output electric power to be constant. Further, it compares those detection results to the limit values LV1, LV2 and LV3, which are determined within an inside of the calculation processing circuit 17. Herein, the limit value LV1 is indicative of an output voltage limit value, the limit value LV2 an output current limit value, and the limit value LV3 an overheat limit value, which is a limit value of the temperature of the discharge lamp lighting apparatus, respectively. In a case when it comes to be equal to or greater than LV3 in the result of the output voltage detection, or when it comes to be equal to or greater than LV3 in the result of observation on the thermistor, the calculation processing circuit 17 transmits signals to the ON/OFF signal input terminal 20 of the PWM controller circuit 19 and the ON/OFF signal input terminal 24 of the drive circuit 23, so that the discharge lamp lighting apparatus stops the operation thereof, or in a case when it comes to be equal to or greater than LV2 in the result of detection of the output current, it provides a control voltage to the control voltage input terminal 20 of the PWM controller circuit 19, thereby controlling the PWM controller circuit 19 so that the output current is restricted with a current value which is determined by LV2. The calculation processing circuit 17 operates upon supply of electric power from the electric power source 15 for the calculation processing circuit. The electric power supply of the electric power source 15 for the calculation processing circuit is turned ON/OFF by the function of the calculation processing circuit ON/OFF circuit 16. The calculation processing circuit ON/OFF circuit 16 has a built-in timer therein, and it stops the electric power supply to the calculation processing circuit from the calculation processing circuit electric power source 15, during a time period from when the discharge lamp starts the lighting up to when it generates a high voltage, after receiving an input from the lamp-ON input terminal 14 (i.e., t0–t3 in FIG. 2, which will be mentioned later).

Figure 2:
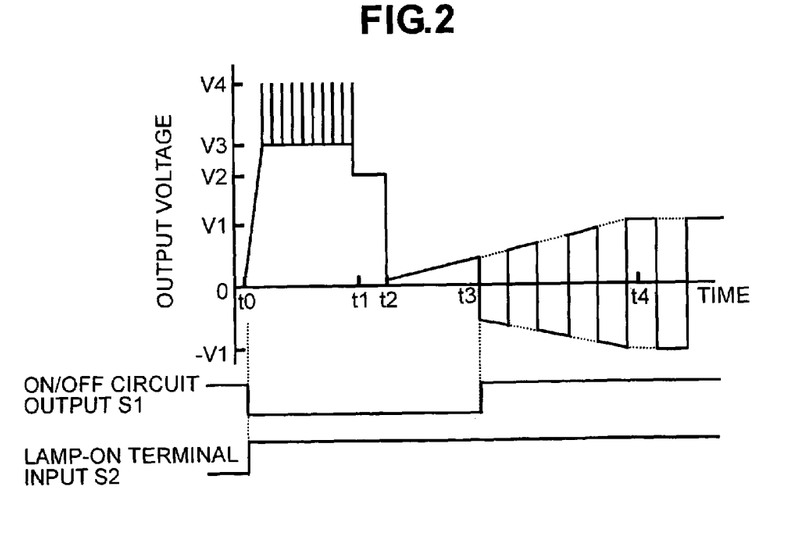
FIG. 2 is a waveform view for explaining an output voltage and operation of an electric power source for a calculation processing circuit, from a time when the discharge lamp starts the lighting up to a time when it turns into a stable lighting condition thereof, in the first embodiment of the discharge lamp lighting apparatus, according to the present invention.

Explanation will be given about the operation of the electric power ON/OFF circuit for the calculation processing circuit shown in FIG. 1, by referring to FIGS. 2 and 3. Herein, FIG. 2 is a timing chart for explaining an output voltage and the operation of the electric power source 15 for the calculation processing circuit, from the time when the discharge lamp lighting apparatus receives an input from the lamp-ON input terminal 14 up to the time when it comes into a stable lighting condition thereof. In this FIG. 2, S1 depicts the output voltage of the ON/OFF circuit for the calculation processing circuit shown in FIG. 1 mentioned above, and S2 the voltage at the lamp-ON input terminal 14, which is also shown in FIG. 1.

Since the lamp 13 does not light, the electric power controller circuit provides an output of the maximum voltage V3 when a lamp-ON signal is inputted at a time t0. Then, voltage V4, obtained by superposing high-voltage pulses supplied from the igniter circuit 27 upon the voltage V3 mentioned above, is applied across the high-pressure discharge lamp 13; therefore, the lamp starts the lighting. For this reason, noises can be generated very easily during this time period t0–t2, in particular. Then, the output voltage of the ON/OFF circuit 16 for the calculation processing circuit is turned OFF, so as to stop the supply of electric power to the calculation processing circuit 17, thereby protecting the calculation processing circuit 17 from falling down into the malfunction thereof. Also, a glow-discharge starts at the time t1, with high voltage and small current, and further at the time t2, it is shifted into an arc-discharge, with low voltage and large current. Accompanying an increase of temperature of the lamp, the lamp voltage goes up. At a time t3, the output of the ON/OFF circuit 16 for the calculation processing circuit is turned ON, and then the electric power is supplied to the calculation processing circuit 17. Therefore, an alternating current (AC) converter circuit starts the operation thereof, and the high-pressure discharge lamp 13 shifts the operation into an AC lighting mode. Thereafter, the electric power controller circuit supplies a constant electric power to the high-pressure discharge lamp through the constant electric power control when it comes to a steady voltage V1 at a time t4.

Figure 3A:
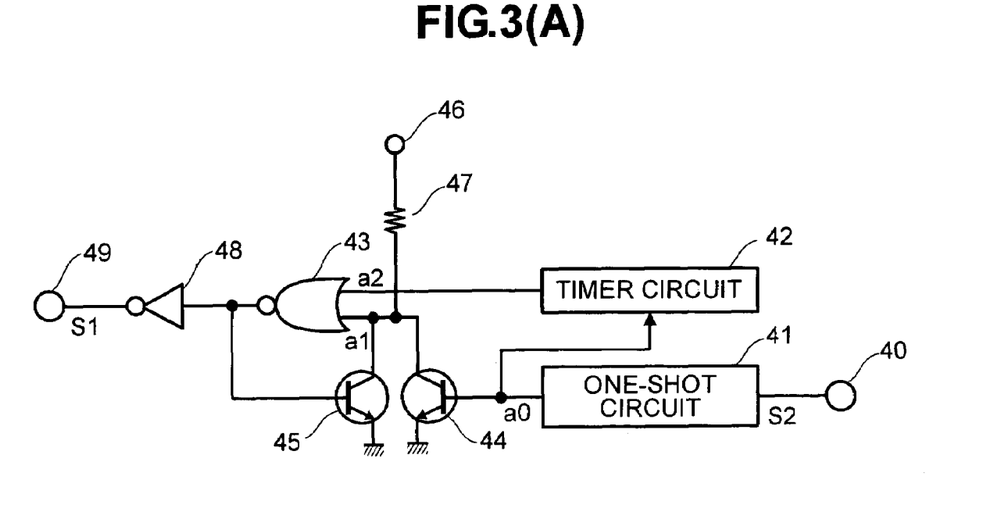
FIG. 3(A) is a block diagram for explaining the operation of an ON/OFF circuit of the electric power source for the calculation processing circuit shown in FIG. 1.

FIG. 3(A) shows an example of the circuitry structure of the ON/OFF circuit for the calculation processing circuit shown in FIG. 1 mentioned above. In this FIG. 3(A), a reference numeral 40 depicts a lamp-ON signal input terminal, 41 a one-shot circuit, 42 a timer circuit, 43 a NOR circuit, 44 and 45 transistors, 46 an electric power input terminal, 47 a resistor, 48 an inverter circuit, 49 an output terminal of ON/OFF circuit for the calculation processing circuit.

Figure 3B:
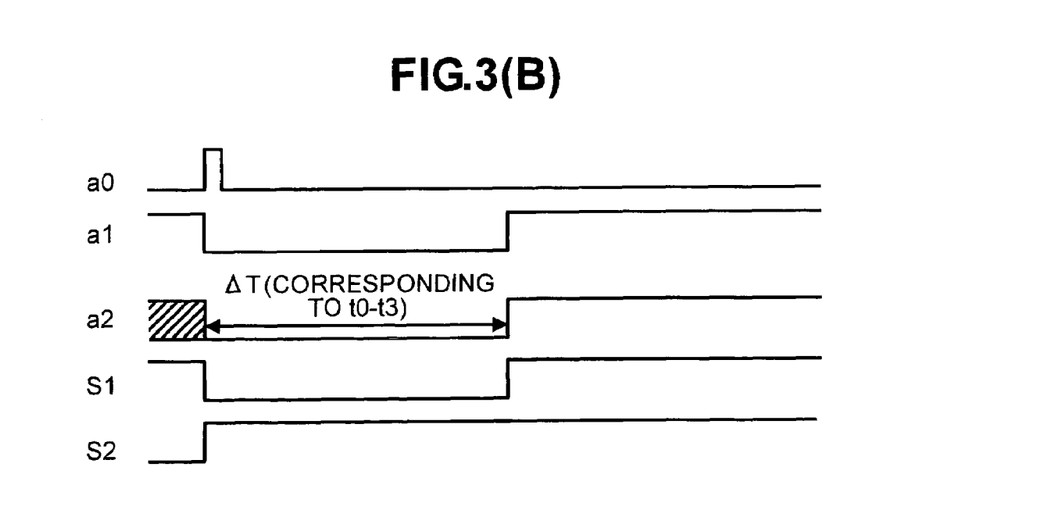
FIG. 3(B) shows the waveforms of signals thereof.

When the lamp-ON signal is inputted onto the lamp-ON input terminal 14 shown in FIG. 1 from an outside of the discharge lamp lighting apparatus, the lamp-ON signal is inputted into the lamp-ON signal input terminal 40 shown in FIG. 3(A), and then an edge of changeover of the lamp-ON signal is detected within the one-shot circuit 41; thereby, generating a rectangular or square waveform signal, being "Hi (high)" for a certain time period (hereinafter, being called by "signal a0"), to be inputted into the timer circuit 42 and a base of the transistor 44, as shown in FIG. 3(B). The timer circuit 42 starts a reset of the timer when it inputs the rectangular waveform signal of the one-shot circuit 41 mentioned above, and it outputs a signal changing from "Low" into "Hi" (hereinafter, a "signal a1") after passing through a certain time period (hereinafter, "ΔT") from it. Also, into the NOR circuit 43 are inputted the signal a1 and a signal, which is produced by the transistor 44 and 45, the electric power inputting terminal 46 and the resistor 47 (hereinafter, a "signal a2"). Also, in a case where an output of the NOR circuit 43 is in "Hi", then the transistor 45 is turned ON, thereby latching the signal a2 into "Low". Now, assuming that the signal a0 is outputted from the one-shot circuit 41, the transistor 44 is turned ON, therefore the output of the NOR circuit 43 comes to be "Low" during the time period when the outputted signal a0 is in "Hi" in the condition thereof. Also, since the timer circuit 42 is reset-started with the signal a0, the signal a2 is "Low" in the condition thereof. For this reason, an output of the NOR circuit 43 comes to be "Hi", while the signal a2 is latched into "Low" through turning ON of the transistor 45, thereby bringing into the condition of waiting an input of the signal a2. In this instance, the electric power ON/OFF circuit output terminal 49 for the calculation processing circuit is switched from "Hi" into "Low", and it is latched in the condition of stopping the electric power supply of the electric power source 15 for the calculation processing circuit to the calculation processing circuit 17. Thereafter, when passing through the time period ΔT of the timer within the timer circuit 42, the output of the timer circuit, i.e., the signal a1 is switched from "Low" into "Hi". With this, the output of the NOR circuit 43 is switched from "Hi" into "Low", therefore the transistor 45 is turned into OFF in the condition thereof; thus, the signal a2 is released from the latching to be "Hi" in the condition thereof. Thus, it is in the condition of waiting an inputting of the signal at the lamp-ON signal input terminal, next. In this instance, the electric power ON/OFF circuit output terminal 40 for the calculation processing circuit is released from the "Low" latching condition and switched into "Hi", therefore the electric power supply is re-started or re-opened to the calculation processing circuit 17 from the electric power source 15 for the calculation processing circuit. With such the operations mentioned above, during the time period where the high voltage is generated for the high-pressure lamp, i.e., the time period ΔT of the timer, it is possible to stop the electric power supply to the calculation processing circuit 17 from the electric power source 15 for the calculation processing circuit.

According to the present invention, however it is not always necessary to stop the electric power supply to the calculation processing circuit 17, but it is only necessary of stopping the operation of the calculation processing circuit 17 for a predetermined time period. For example, in a case where the calculation processing circuit is made up with a microcomputer, it is also possible to control the control terminal of a sleep mode, for brining the microcomputer into the stop condition, with an aid of the calculation processing circuit ON/OFF circuit 16.

As a result of this, it is possible to achieve a swift and stable lighting of the high-pressure discharge lamp, irrespective of the conditions and variability thereof, and also due to the fact that the electric power supply to the calculation processing circuit is stopped during the time period t0–t3 (=ΔT) when the high voltage is generated, it is possible to protect the calculation processing circuit 17 from the malfunction thereof due to the noise generations of high-voltage.

EXAMPLE 2

Figure 4:
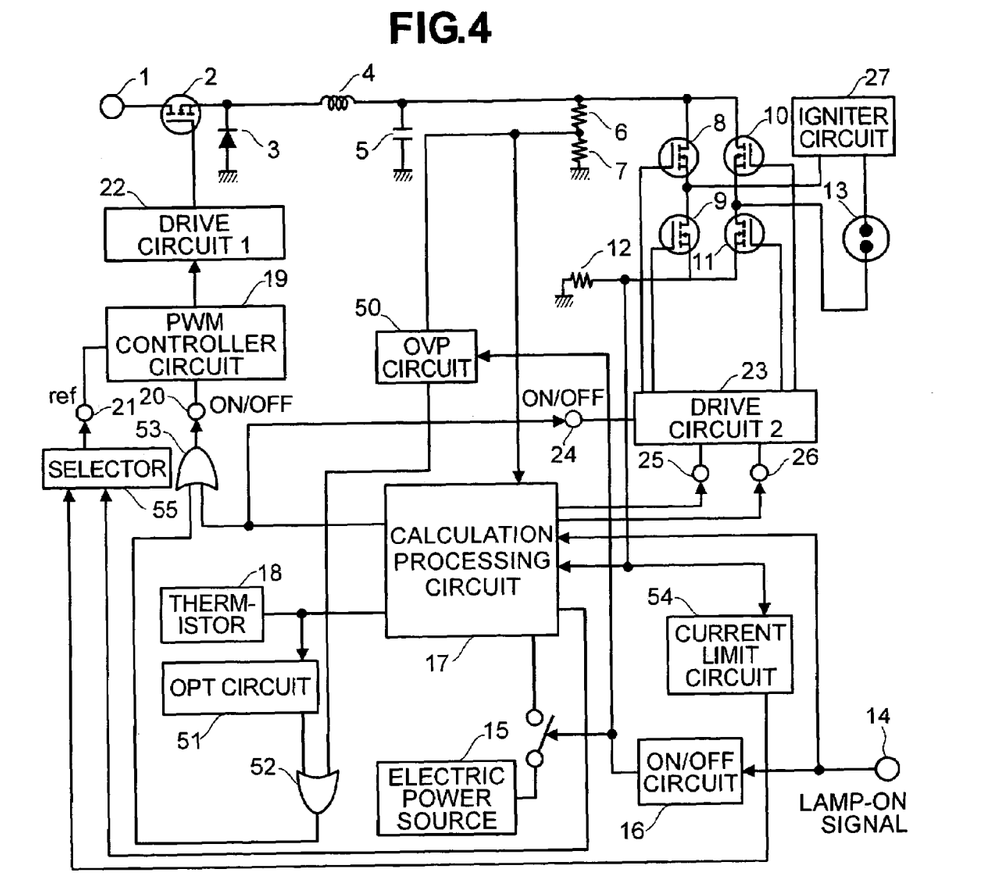
FIG. 4 is a block diagram for showing a second embodiment of the discharge lamp lighting apparatus according to the present invention.

FIG. 4 is a block diagram for showing a second embodiment of the discharge lamp lighting apparatus, according to the present invention. With the present structure, in which protection of circuitry of the discharge lamp lighting apparatus is achieved by adopting the calculation processing circuit 17 and also an analog protection circuit, in common, it is possible to improve up the safety of the discharge lamp lighting apparatus, by the function of the analog protection circuit, even if the calculation processing circuit falls into the malfunction.

In this FIG. 4, those reference numerals 1–27 are same to those shown FIG. 1, and a reference numeral depicts an analog over-voltage detection circuit (hereinafter, an "OVP circuit"), 51 an analogue over-heat detection circuit (hereinafter, an "OTP circuit"), 52 an analog protection circuit (i.e., an OR circuit), 53 an OR circuit, 54 an analog current limit circuit, and 55 a selector, respectively.

The output voltage is detected by means of the OVP circuit 50, temperature of the discharge lamp lighting circuit is watched or observed by means of the OPT circuit 51, and the output current is detected by means of the analog current limit 54, respectively. Each of the OVP circuit 50, the OPT circuit 51 and the analog current limit circuit 54 has a limit value LV4, LV5 or LV6 in an inside thereof, respectively. The value LV4 is produced within the OVP circuit, and it indicates an output voltage limit value. When the output voltage is equal or greater than the voltage value determined with LV4, a result of this is transmitted to the analog protection circuit 52. However, the OVP circuit 50 stops the operation of detection thereof, during the time period t0–t3 in FIG. 2, where the high voltage is generated. Also, LV6 is produced within the OPT circuit 51, and it indicates the limit value of temperature for the discharge lamp lighting apparatus. When the temperature of the discharge lamp lighting apparatus goes up to be equal or greater than the temperature determined by LV6, a result of this is transmitted to the analog protection circuit 52. Upon receipt of the detection results of the OVP circuit 50 and the OTP circuit 51, the analog protection circuit 52 provides an output to the OR circuit 53. The OR circuit 53 takes a logical OR condition among the output signal of the analog protection circuit 52, and the output voltage detection result within the calculation processing circuit 17 and the ON/OFF signal of the PWM controller circuit 19 due to the result of watching upon the thermistor, and then it transmits a result thereof to the ON/OFF signal input terminal of the PWM controller circuit 19, thereby stopping the operation of the electric power controller circuit. The value LV5 is produced within the analog current limit circuit 54, and it indicates an output current limit value. When the output current comes to be equal or greater than the current value determined by LV5, a control voltage is provided, so that the output current be limited within the current value determined by LV5, and this control voltage is outputted to the selector 55. The selector 55 compares the output result of the analog current limit circuit 54 mentioned above and the control voltage due to the result of output current detection within the calculation processing circuit 17, so as to select the lower one between them, and with the voltage selected, the control voltage input terminal 21 of the PWM controller circuit is controlled. Thus, setting the limit values LV4, LV5 and LV6 of those analog circuits to be a little bit higher than the limit values LV1, LV2 and LV3 of the calculation processing circuit 17 enables the calculation processing circuit 17 to function with priority, when the calculation processing circuit 17 operates normally, and also to bring the analog protection circuit 52 and the analog current limit circuit 54 to function under the condition similar to that when the calculation processing circuit operates normally, even if the calculation processing circuit falls into the malfunction thereof, thereby obtaining the protection of the discharge lamp lighting apparatus.

Figure 5:
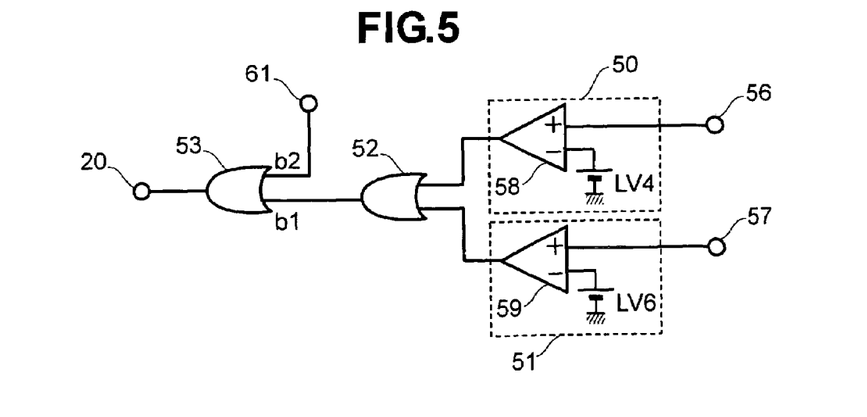
FIG. 5 is a block diagram for showing an example of an analogue protection circuit according to the present invention.

Explanation will be given on the operation of the OVP circuit 50, the OPT circuit 51, the analog protection circuit 52 and the OR circuit 53, shown in FIG. 4, by referring to FIG. 5 attached herewith. FIG. 5 is a block diagram for showing an example of the analog protection circuit, which is built up with the OVP circuit 50, the OPT circuit 51, the analog protection circuit 52, and the OR circuit 53. In FIG. 5, the reference numerals 20, 50, 51, 52 and 53 are same to those shown in FIG. 4, the LV4 and LV6 are the limit values explained in the above. And wherein, a reference numeral 56 indicates the detection voltage of the output voltage, 57 the detection voltage by means of the thermistor 18, while a reference numerals 58 and 59 depict comparators, and also a reference numeral 61 indicates an output signal of the results of comparisons on the output voltage and the detection result of the thermistor with the limit values LV1 and LV3, which are conducted within the calculation processing circuit 17.

The OVP circuit 50 is built up with the comparator 58 and the limit value LV4. The comparator 58 compares the detection output 56 of the output voltage to the limit value LV4, and it provides the output of "Hi" when the detection output 56 of the output voltage comes to be equal or greater than the limit value LV4. In the similar manner, the OTP circuit 51 is built up with the comparator 59 and the limit value LV6. The comparator 59 compares the detection voltage 57 by means of the thermistor 18 and the limit value LV6, and it provides an output of "Hi" when the detection voltage 57 by means of the thermistor 18 comes to equal or greater than the limit value LV6. When any one of the outputs comes to be "Hi" between the comparators 58 and 59 due to the function of the OR circuit 52 inputting the output voltages of the comparators 58 and 59, the output thereof (hereinafter, a "signal b1") is transmitted to the OR circuit 53. To the other input of the OR circuit 53 is inputted an output signal 61 (hereinafter, a "signal b2"), being a result of comparison between the output and the detection result of the thermistor and the limit values LV1 and the LV3, which are conducted with in the calculation processing circuit 17. When either one of the signal b1 or the signal b2 is "Hi" in the condition thereof, the OR circuit 53 transmits the output thereof to the ON/OFF signal input terminal 20 of the PWM controller circuit 19, as was explained in FIG. 4 mentioned above, thereby stopping the operation of the PWM controller circuit 19. With such the present structure, when the discharge lamp lighting apparatus is in the abnormal condition, and even in a case where no abnormal signal b2 is outputted due to the malfunction of the calculation processing circuit 17, it is possible to stop the operation of the PWM controller circuit 19 by means of the analog protection circuit 52.

<Embodiment 3>

Figure 6:
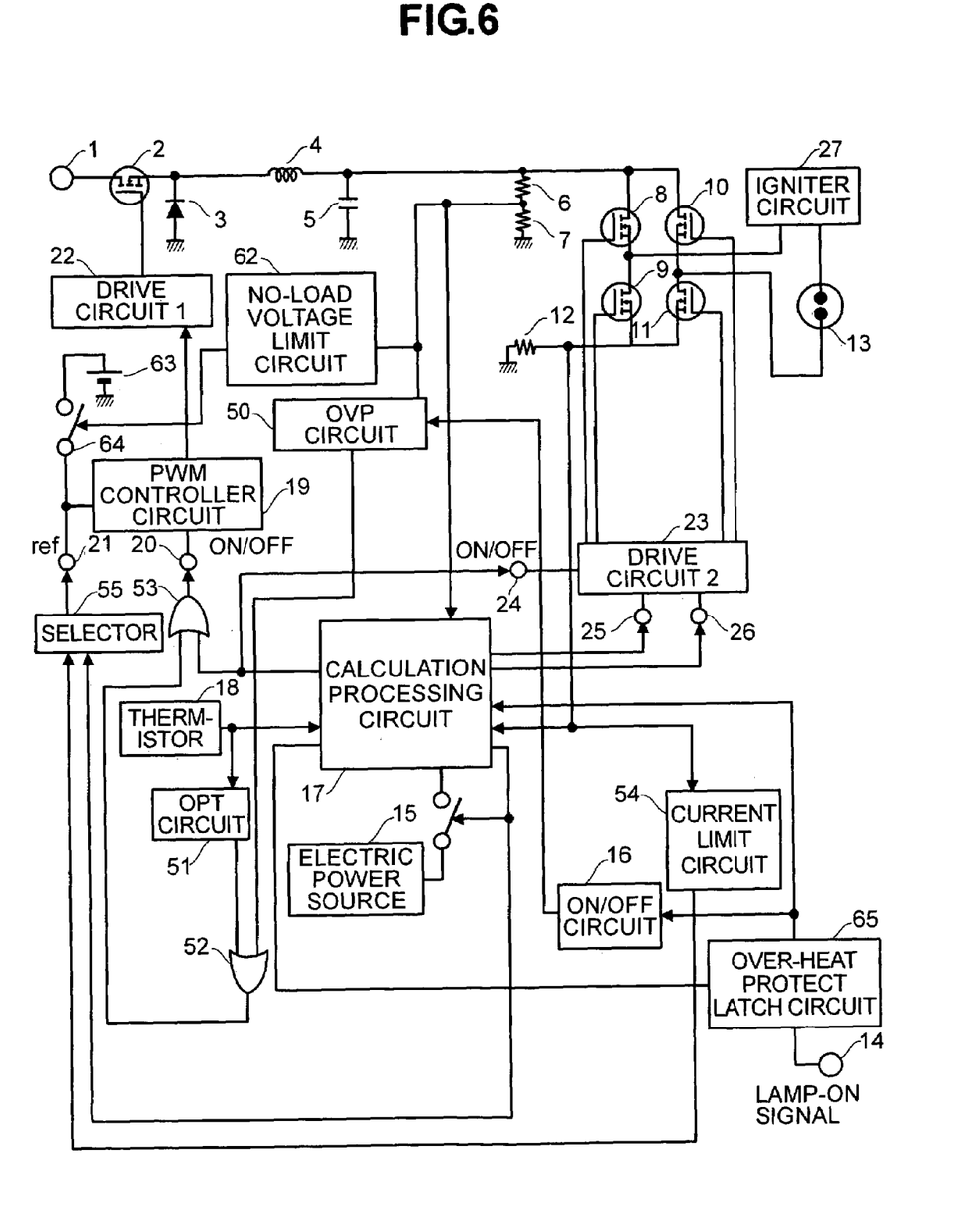
FIG. 6 is a block diagram for showing a third embodiment of the discharge lamp lighting apparatus according to the present invention.

FIG. 6 is a block diagram of a third embodiment of the discharge lamp lighting apparatus, according to the present invention. With the present structure, it is possible to restrict an open-circuit voltage or no-load voltage when the discharge lamp is in the open-circuit condition, and also since more reliable protection can be expected in the dangerous condition, where the temperature of the discharge lamp lighting apparatus rises up high during the protection operation of the OTP circuit, therefore it is possible to improve up the safety of the discharge lamp lighting apparatus.

In this FIG. 6, the reference numerals 1–27 and 50–55 are same to those shown in FIG. 2 mentioned above, and wherein a reference numeral 62 depicts an open-circuit or no-load voltage limit circuit, 63 a limit electric power source, 64 a switch means, and 65 a over-heat protection latch circuit. The no-load voltage limit circuit 62 has a limit value LV7 in an inside thereof. The value LV7 is an output voltage limit value, but the voltage value determined by LV7 is sufficiently high, comparing to the output voltage generated when the discharge lamp turns on normally. Thus, when comparing the output voltage limit value LV1 within the calculation processing circuit 17 and the limit value LV4 of the OVP circuit 50, a relationship is established, which can be expressed by the following equation:

LV1<LV4<<LV7

The present limit value LV7 is set for restricting the no-load voltage when the discharge lamp is in the open-circuit condition. The no-load voltage limit circuit 62 turns the switch means 64 ON when the non-load voltage is equal or greater than the voltage value determined by LV7, so as to apply the voltage of the limit voltage source 63 to the control voltage input terminal of the PWM controller circuit 19, thereby controlling the PWM controller circuit 19. The over-heat protection latch circuit 65 brings the lamp-ON input terminal into the latch condition while keeping it into the lamp-ON condition, in a case when the temperature of the discharge lamp lighting apparatus comes to be equal or greater than the temperature determined with the over-heat protection limit value LV3 which is produced within the calculation processing circuit 17, thereby stopping the operation of the lighting circuit, and even if the signal of lamp-ON or lamp-OFF signal is inputted onto the lamp-ON input terminal 14 from an outside of the discharge lamp lighting apparatus, again, it latches the input signals to the calculation processing circuit 17 and the electric power ON/OFF circuit 16 for the calculation processing circuit, thereby preventing the discharge lamp lighting apparatus from being turned on, again. As a result of adding of those circuits, it is possible to restrict the no-load voltage when the discharge lamp is in the open-circuit condition, thereby improving the safety when the discharge lamp is in the open-circuit condition. Also, protecting the lighting apparatus from being turned ON, again under the dangerous condition where the temperature increases within the lighting apparatus, increases up the safety.

Figure 7:
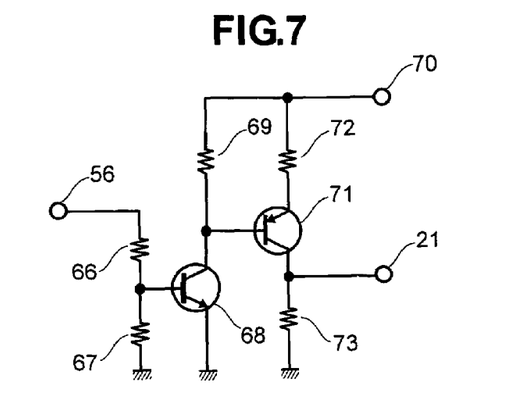
FIG. 7 is a block diagram for explaining the operation of a discharge voltage generation circuit shown in FIG. 6.

Explanation will be given on the operation of the no-load voltage limit circuit 62, by referring to FIG. 7. In the circuit structure shown in FIG. 1 and/or FIG. 4, since it is impossible to control the PWM controller circuit 19 when the discharge lamp is in the open-circuit condition where no current flows through, there is a problem that the no-load voltage cannot be controlled. With the circuit shown in FIG. 7, it is possible to dissolve the problem mentioned above. FIG. 7 shows an example of the circuit structure for achieving the no-load voltage limit circuit 62. In this FIG. 7, the reference numeral 21 is the same to that shown in FIG. 6, and a reference numeral 56 depicts the detection voltage of the output voltage (i.e., the divided voltage by the resistors 6 and 7), while reference numerals 66, 67, 69, 72 and 73 depict resistors, 68 a NPN transistor, 70 an electric power input terminal, and 71 a PNT transistor.

The NPN transistor 68 is supplied with base current through the resistors 66 and 67. When the voltage of the detection voltage 56 of the output voltage goes up so that the NPN transistor 68 is turned ON, the NPN transistor 68 is turned ON, and following to this, the PNP transistor 71 (corresponding to the switch means 62 shown in FIG. 6) is turned ON. Also, since the resistor 69 is a resistor provided for protecting the PNP transistor from overflow of the base-current thereof, therefore collector current is supplied to the NPN transistor 68, the current value of which is determined by the electric power input terminal 70 and the resistor 69, thereby adjusting the base current of the PNP transistor 71. When the PNP transistor 71 is turned ON, the voltage produced by means of the electric power input terminal 70 and the resistors 72 and 73 (corresponding to the limit voltage source 63 shown in FIG. 6) is inputted to the control voltage input terminal 21 of the PMW limit circuit 19. With this, when the output voltage rises up to the minimum voltage value, at which the PNP transistor 68 is turned ON first, the output electric power controller circuit is controlled by means of the PWM controller circuit 19, thereby controlling the output voltage at the minimum voltage value mentioned above. Also, the control voltage value can be set at, arbitrarily, depending upon a resistor ratio between the resistors R66 and R67. Further, with the output voltage when the discharge lamp is in the open-circuit condition, there is a possibility that it is outputted with fully high voltage, comparing to that in the case when the discharge lamp lights up normally. For this reason, the output voltage limit value determined by the resistors R66 and R67 mentioned above is set at the voltage value, which is higher than the maximum output voltage value when the discharge lamp lights up normally, therefore it is possible to control the voltage when the discharge lamp is in the open-circuit condition, but without giving ill influences upon the control of the output electric power controller circuit when the discharge lamp lights up normally.

<Embodiment 4>

Figure 8:
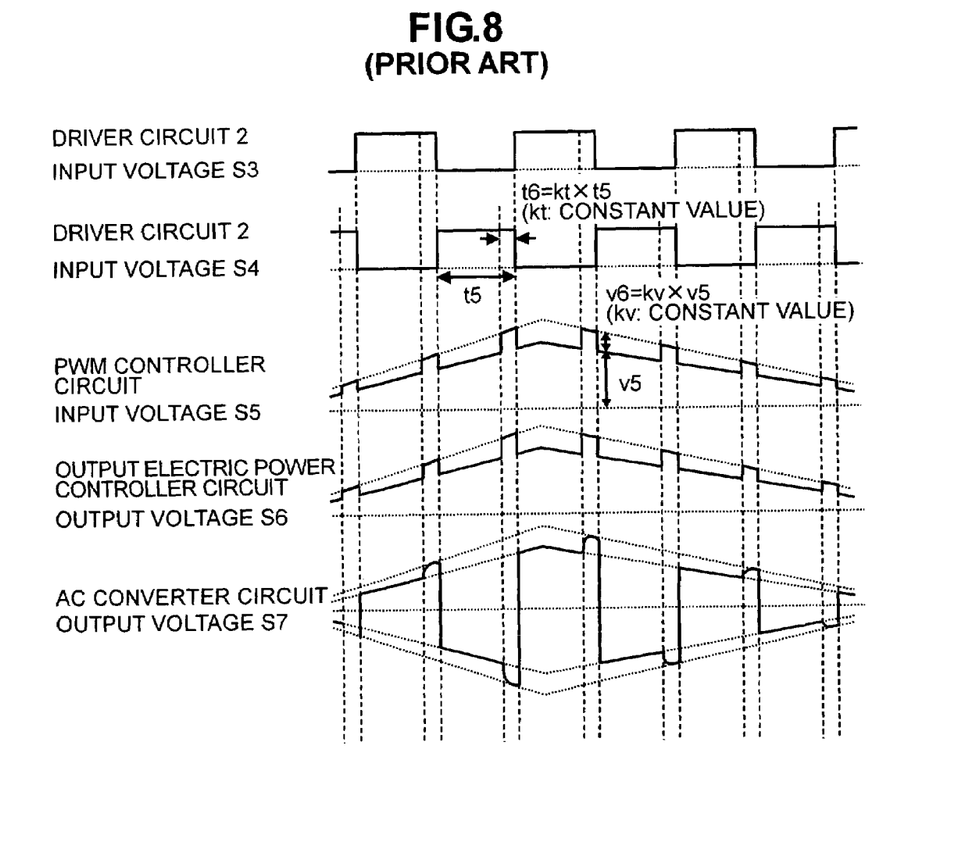
FIG. 8 is a view for explaining the discharge lamp lighting apparatus, in which the conventional art is applied.
Figure 9:
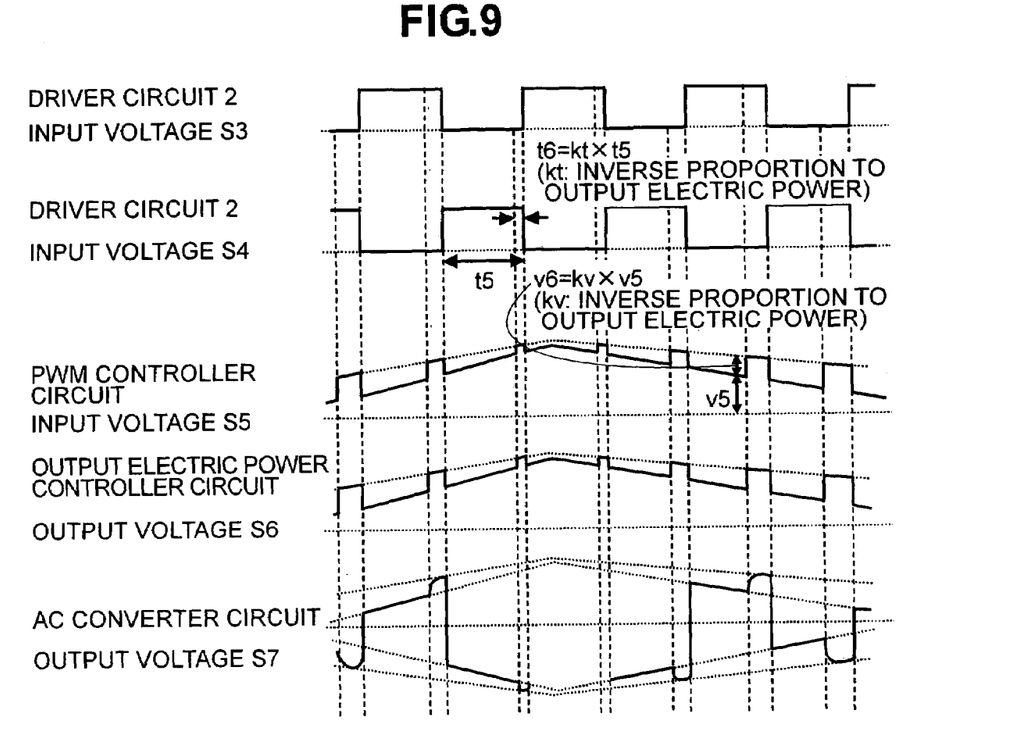
FIG. 9 is a block diagram for showing a fourth embodiment of the discharge lamp lighting apparatus according to the present invention.

FIG. 9 is a view for explaining a fourth embodiment of the discharge lamp lighting apparatus, according to the present invention. The present embodiment is same to the first embodiment in the structure thereof, wherein a flicker of the discharge lamp is suppressed by the control of the calculation processing circuit 17. FIG. 8 is a view for explaining the flicker suppressing means for the discharge lamp in relation to the conventional art. S3 and S4 in FIG. 8 depict rectangular waveform control voltages, being opposite to each other in the phase, which are outputted from the calculation processing circuit 17 to the drive circuit 23 shown in FIG. 1. S5 is a control signal voltage, which is outputted from the calculation processing circuit 17 to the PWM controller circuit 19 shown in FIG. 1. S6 is an output voltage of the output electric power controller circuit, and S7 is an output voltage of the AC generator circuit. The time period t5 is same to a half cycle of the AC generator circuit, and t6 is superposing voltage width. Herein, assuming that a ratio coefficient between t5 and t6 is kt, then the following relationship is established:

$$t6=kt \times t5$$

Further, v5 indicats the control voltage value of the PWM controller circuit 19, and v6 the height of the superposed voltage. Herein, assuming that the ratio coefficient between v5 and v6 is kv, then the following relationship is established:

$$v6=kv \times t5$$

In the present operation, each of kt and kv has a constant value. When the signal shown by S5 produced from the calculation processing circuit 17 is inputted to the PWM controller circuit 19, voltage as high as (v6−v5)/v5=(kv−1) times of the voltage is superposed on the output voltage of the output electric power controller circuit, in synchronism with S5, for the time period t6, thereby generating the voltage shown by S6. If such the output S6 of the output electric power controller circuit is converted into the AC voltage within the AC controller circuit, then the voltage as high as (kv−1) times of the voltage is superposed, in synchronism with S5 and S6, for the time period t6, as shown by S7. As a result of this, the above-mentioned voltage of a constant amount of superposition is transmitted to the discharge lamp through the igniter circuit 22, thereby enabling suppression of flicker of the discharge lamp. However, when the output electric power is small, there is still remained a problem that the flicker is generated in the discharge lamp even if adopting the present structure into the discharge lamp lighting apparatus.

FIG. 9 is the view for explaining the fourth embodiment of the discharge lamp lighting apparatus, according to the present invention. In this FIG. 9, reference numerals S3–S7, v5, v6, t5 and t6 indicate the same signals as shown in FIG. 8 mentioned above. However, in the present structure, the values of kt and kv are variable depending upon an increase or decrease of the output electric power. Thus, the larger the output electric power, the smaller the values of kt and kv, on the contrary to this, the smaller the output electric power, the larger the values kt and kv. As a result of this, with adjusting the variation values of kt and kv, it is possible to suppress the flicker of the discharge lamp in the case when the output electric power is small, although it comes up to be the problem encountered in the method shown in FIG. 8 mentioned above.

Further, according to the present embodiment, it is possible to adjust the position (or the phase) of the superposed voltage on the output voltage of the AC converter circuit, arbitrarily, through changing a setting value of the calculation processing circuit 17. Also, it is further possible to superpose the voltage at an arbitrary phase on the output voltage of the AC converter circuit, in the similar manner as was mentioned above, by bringing an outside sync signal inputted from an outside of the discharge lamp lighting apparatus and the output voltage of the AC converter circuit into the synchronism with. Moreover, about synchronizing patterns with the outside sync signal, it is also possible to obtain the synchronization, not only at an rise-up edge portion or at a fall-down edge, but also, at both edges of the rise-up portion and the fall-down portion thereof, in addition thereto.

<Embodiment 5>

Figure 11:
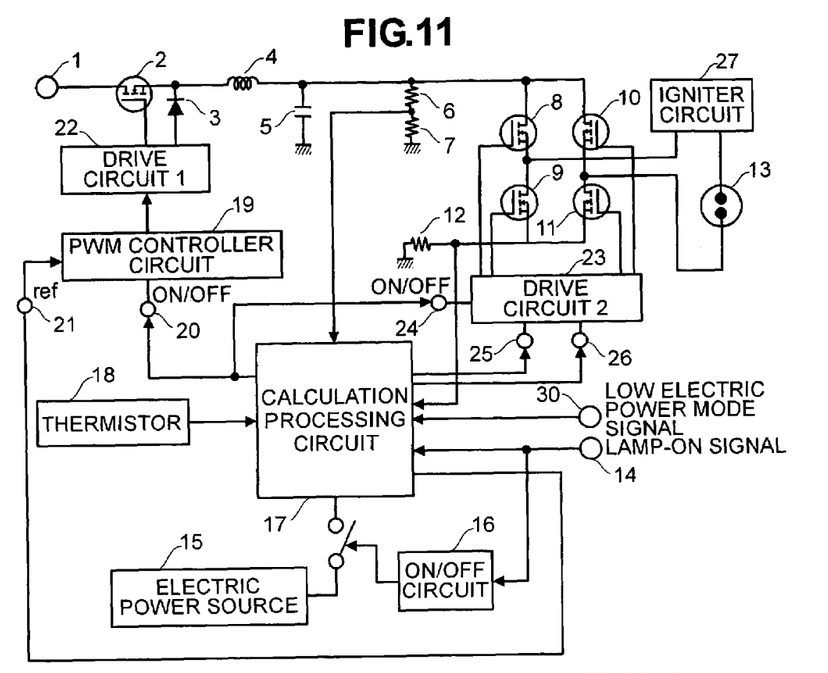
FIG. 11 is a block diagram for showing a fifth embodiment of the discharge lamp lighting apparatus according to the present invention.

Next, the structure of a fifth embodiment according to the present embodiment is shown in FIG. 11. The feature of the present embodiment lies in a measure made in a light-out sequence of the discharge lamp with an aid of the calculation processing circuit, thereby obtaining a long lifetime of the discharge lamp. FIG. 11 is the view for showing the fifth embodiment of the present invention, and wherein the same reference numerals are attached onto the elements or portions corresponding to those of the first embodiment shown in FIG. 1. A portion differing from it lies in a low electric power mode terminal 30. Since others are same to those of the first embodiment, the explanations thereof are omitted herein.

In general, the discharge lamp available in recent years has four (4) conditions: i.e., a light-out mode where the lamp is turned out; a normal electric power mode where it is turned on normally; a low electric power mode where it is turned on with suppressing the electric power lower than that of the normal electric power mode; and an ultra low electric power mode where it is turned on, but reducing the electric power once, down to be equal or less than 50%, such as, 30% of the normal electric power mode, for example, and maintaining this, when it is shifted from the normal electric power mode or the low electric power mode into the light-out mode.

The low electric power mode, turning on the lamp with suppressing the electric power, such as, 80% of the normal electric power mode, for example, enables the following effects; i.e., suppression of electric power consumption, a long lifetime of the lamp, and also, since it is also possible to lowers down a revolution number of a fan for cooling the lamp, there can be obtain an effect of lowering the noise generation therefrom.

The ultra low electric power mode, not moving into the electric power "0 (zero)" when shifting the lamp from the lighting-up condition into the lighting-out condition directly, but maintaining a small electric power once, thereby reducing the deterioration of electrodes thereof, therefore it is said that it enables to contribute the long lifetime of the lamp.

However, when shifting from the normal electric power mode or the low electric power mode into the ultra low electric, the electric power is changed from 100% (or 80%) down to 30%, for example, at a moment, therefore there can be considered the deterioration of electrodes due to this.

Therefore, according to the present embodiment, when shifting from the normal electric power mode or the low electric power mode into the ultra low electric, there is provided a time period for decreasing the electric power, gradually. With this, it is possible to obtain a further reduction of deterioration of electrodes.

Figure 12:
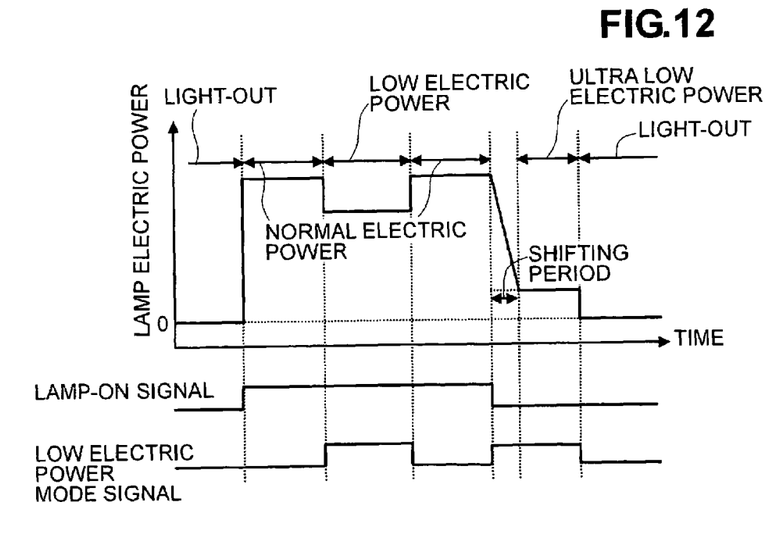
FIG. 12 is a timing chart for explaining the operation of the fifth embodiment.

A timing chart for sequences of reducing the electric power is shown in FIG. 12. In this FIG. 12, it starts from a light-out mode, and then shifting into the normal electric power mode. And, after shifting into the low electric power mode once, it turns back to the normal electric power mode. And, when it shifts from the normal electric power mode into the ultra low electric power mode, the electric power is reduced down, by taking a time period, such as, about several seconds, for example. And, finally, it is shifted into the light-out mode.

The four (4) modes of the lamp is discriminated through a combination two (2) bits, including a lamp ON signal at the lamp-ON terminal 14, which is inputted into the calculation processing circuit 17, and a low electric power signal at the low electric power mode terminal 30. Thus, if the combination of the lamp-ON signal and the low electric power signal is (Low, Low), for example, it can be discriminated that the lamp be in the light-out mode; if it is (Hi, Low), the normal electric power mode; if it is (Hi, Hi), the low electric power mode; and if it is (Low, Hi), the ultra low electric power mode, respectively.

The processing steps for discriminating those four (4) modes mentioned above are shown in a flowchart of FIG. 13, in the calculation processing circuit 17, thereby conducting the electric power control as shown in FIG. 12 mentioned above.

Figure 13:
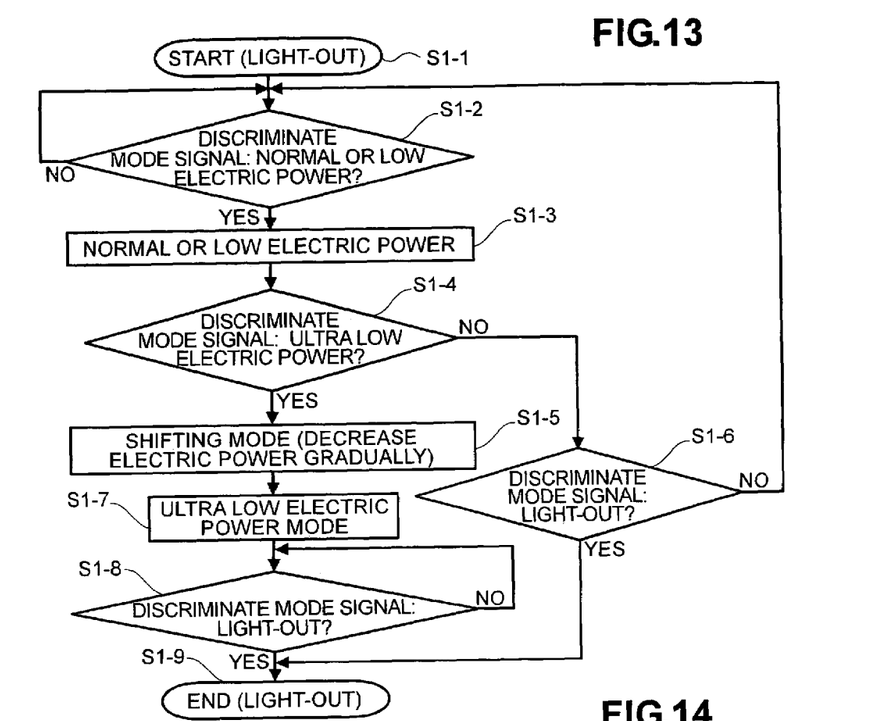
FIG. 13 is a flowchart for explaining the operation of the fifth embodiment.

In this FIG. 13, first of all, the condition starts from the light-out mode (S1-1). Next, the input mode is discriminated (S1-2), wherein if it is the normal electric power mode or the low electric power mode, the electric power control is conducted so that the lamp can operate in that mode (S1-3), on the other hand, if it is other than those, the process turns back to the discrimination of the input mode (S1-2), again. Next, the input mode is discriminated (S1-4) from the condition of (S1-3), and if it is the ultra low electric power mode, after passing through a shift mode (S1-5) for reducing the electric power, gradually, by taking a time period, being equal to or greater than 0.5 second and, preferably, about 3 seconds, for example, the process moves into an ultra low electric power mode (S1-7). Next, discriminating the input mode (S1-8) from the condition of (S1-7), and if it is the light-out mode, the process moves into a light-out mode (S1-9), on the other hand if it is other than that, it turns back to the discrimination of input mode (S1-8), again. Herein, if it is other than the ultra low electric power mode in the discrimination of input mode of (S1-4), the input mode is discriminated (S1-6), and wherein if it is the light-out mode, the process moves into the light-out mode (S1-9), and if it is other than that, it turns back to the discrimination of the input mode (S1-2), again. With the processing steps mentioned above, it is possible to conduct the electric power control as shown in FIG. 12 mentioned above.

However, in the shift mode in (S1-5), the electric power may be, not only reduced down in a linear manner with respect to the time as shown in FIG. 12, but also reduced down non-linearly, and it may be determined depending upon the characteristics of the discharge lamp to be applied. Also, the shifting time is enough to be several seconds, for example, but it may be adjusted depending upon the characteristics of the discharge lamp.

<Embodiment 6>

Next, explanation will be given on the operation of a sixth embodiment, according to the present invention, by referring to FIG. 14. The present embodiment is same to the fifth embodiment in the circuit structure thereof, however it differs from in the operation thereof. An aspect differing from lies in the processes when the low electric power mode.

Figure 14:
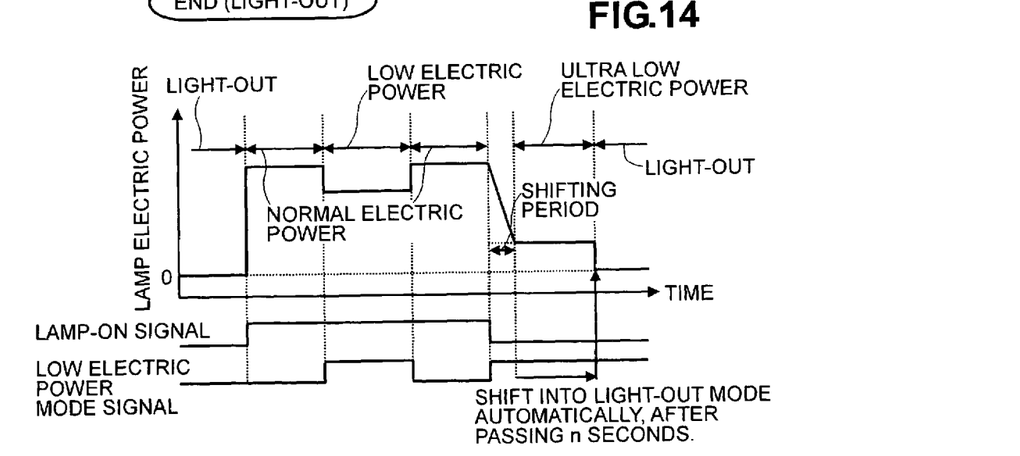
FIG. 14 is a timing chart for explaining the operation of a sixth embodiment.

Namely, according to the timing charge shown in FIG. 14, comparing to that shown in FIG. 12, the completely same operation is carried out up to the time when the process is shifted into the ultra low electric power mode, however after shifting into the ultra low electric power mode, it turns into the light-out mode, automatically, if the low electric power mode signal turns to be "Low" in spite of elapse of "n" seconds, in the operation. This is an operation for protecting when the mode control is not normal in the condition thereof, which is supplied from an outside of the discharge lamp lighting apparatus.

Figure 15:
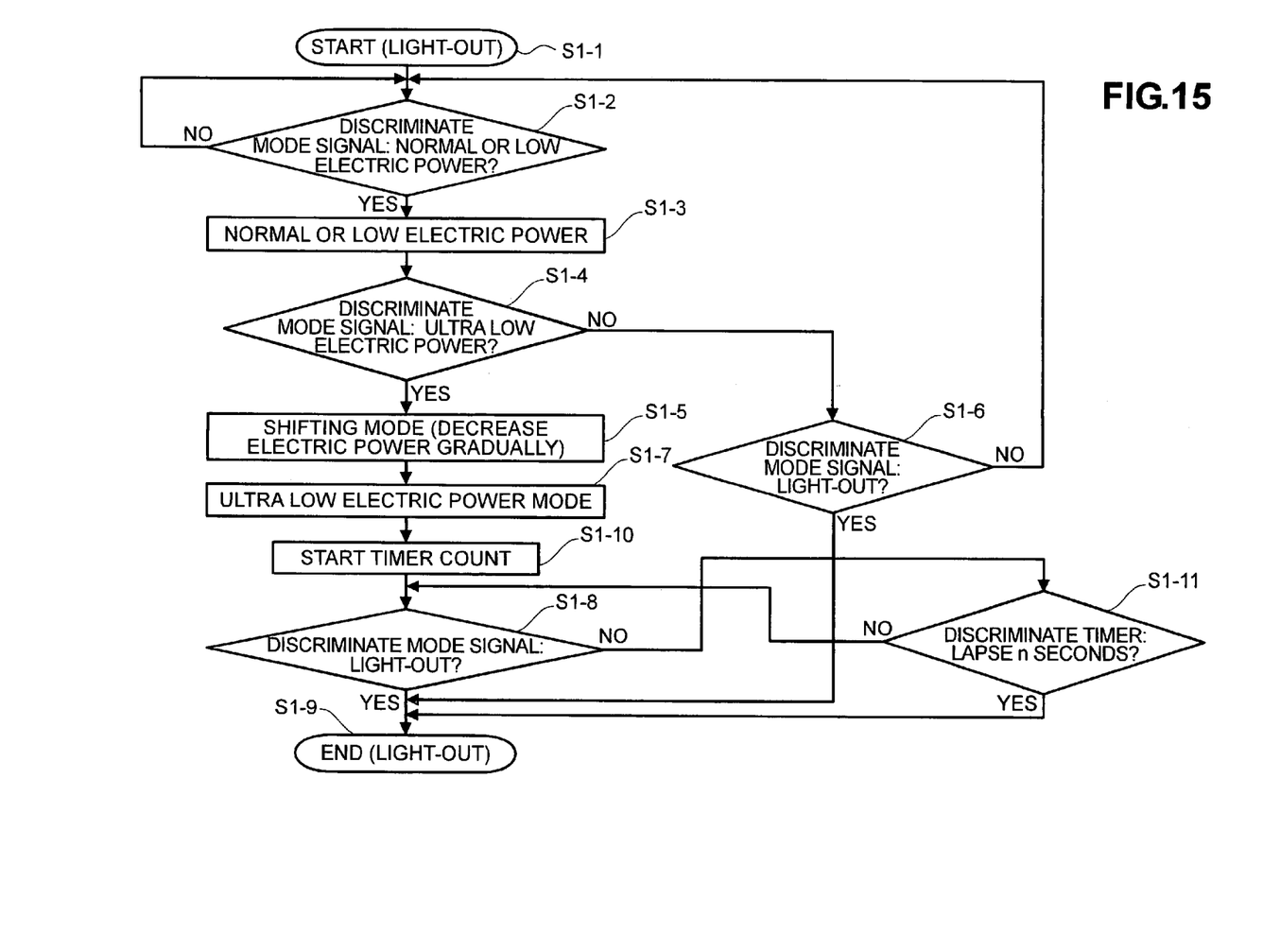
FIG. 15 is a flowchart for explaining the operation of the sixth embodiment.

The processing steps of the electric power control shown in FIG. 14, conducted within the calculation processing circuit 17, will be shown in the flowchart shown in FIG. 15.

Those other than the steps S1-10 and S1-11 are same to those shown in FIG. 13, and therefore explanation will be omitted on those portions, herein.

First of all, after turning into the ultra low electric power mode (S1-7), the timer counter is reset and is also started (S1-10), which is provided within the calculation processing circuit 17. In cases where it is determined to be those other than the light-out mode in the step of discrimination of input mode (S1-8), the process shifts into a step of timer discrimination (S1-11), thereby turning back to the step of discrimination of input mode (S1-8) when it is determined to be less than the predetermined time period (i.e., "n" seconds) by means of the timer. On the other hand, if it is determined to be equal or greater than the predetermined time period (i.e., "n" seconds) by means of the timer, the step is shifted into the light-out mode (S1-9), and therefore, it can shift into the light-out mode, automatically, even if the input mode is not set to be the light-out mode.

With such the operation as was mentioned above, it is possible to shift the step into the light-out mode, automatically, even in the case where the combination of the lamp-ON signal and the low electric power signal will not to be (Low, Low) due to any drawback in the control supplied from an outside of the discharge lamp lighting apparatus, although inherently it should be (Low, Low) so that the lamp turns into the light-out mode after turning into the ultra low electric power mode.

<Embodiment 7>

Figure 16:
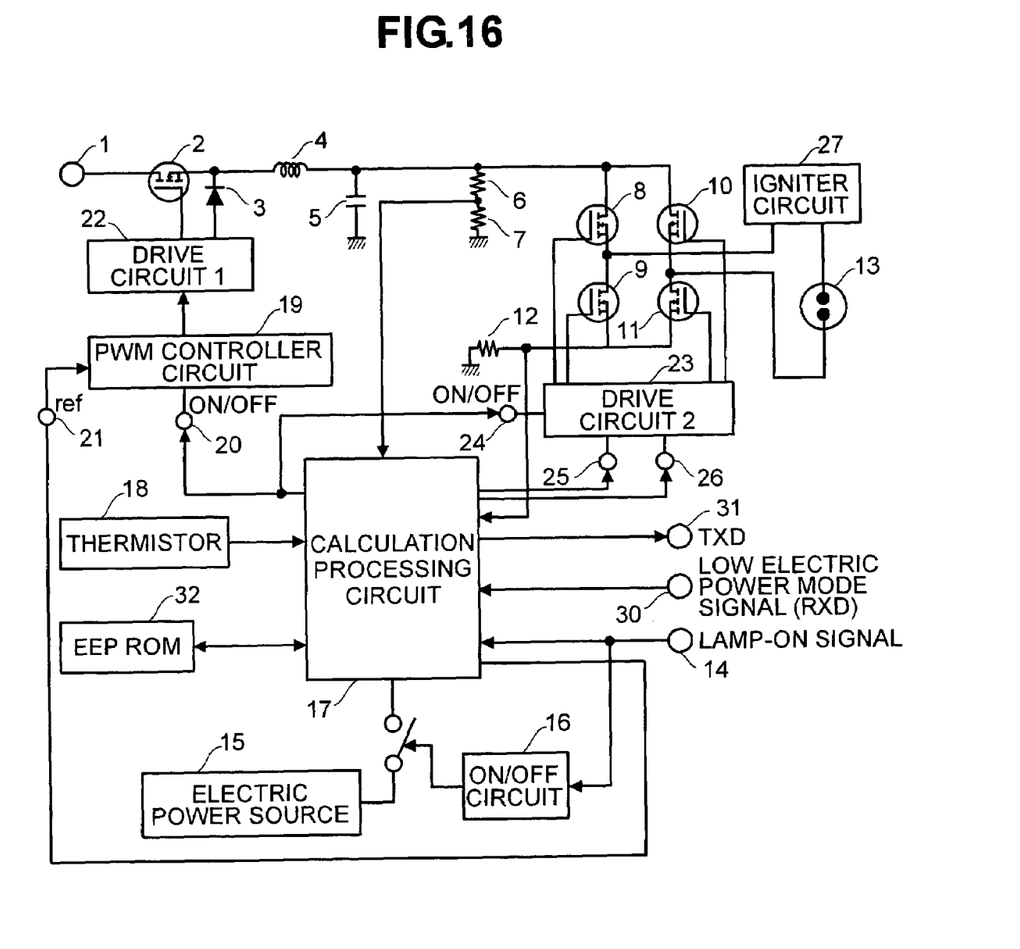
FIG. 16 is a block diagram for showing a seventh embodiment of the discharge lamp lighting apparatus according to the present invention.

Next, the structure of a seventh embodiment according to the present invention will be shown in FIG. 16. The feature of the present embodiment lies in that in an outside of the calculation processing circuit is added a nonvolatile memory for reserving data for use of various settings, and also that the contents of the nonvolatile memory can be re-written from an outside of the discharge lamp lighting apparatus, thereby improving flexibility of the discharge lamp lighting apparatus.

FIG. 16 is a view for showing the structure of the seventh embodiment according to the present invention, wherein the same reference numerals are attached on the portions or elements corresponding to those of the fifth embodiment showing in FIG. 11. The portion differing from lies in an EEPROM 32 and a TXD 31. Others than those are same to those of the fifth embodiment, and therefore explanation will be omitted thereabout, herein.

The EEPROM 32 carries out reading/writing of data through a serial data transmission or communication with the calculation processing circuit 17, which is made up with two (2) pieces of lines, such as, a data line and a clock line, for example. For the communication between the calculation processing circuit 17 and the discharge lamp lighting apparatus, for example, UART (Universal Asynchronous Receiver Transmitter) is applied, with using the low electric power mode terminal 30 to be a serial data receiving terminal (hereinafter, "RXD") in common, and further adding a serial data transmitting terminal (hereinafter, "TXD") 31 thereto.

When writing data into the EEPROM 32 from an outside of the discharge lamp lighting apparatus, the address thereof and data are transmitted to the calculation processing circuit 17 via the RXD 30. Upon relaying this, the calculation processing circuit 17 carries out the writing process of data of said the address into the EEPROM 32.

When reading out data of the EEPROM 32 from the outside of the discharge lamp lighting apparatus, the address is transmitted via the RXD 30 to the calculation processing circuit 17. Upon relaying this, the calculation processing circuit 17 carries out the process of reading out the data of said the address to the EEPROM 32. When completing the read-out of said the data, the calculation processing circuit 17 transmits that data to the outside via the TXD 31.

With such the processes as was mentioned above, it is possible to read and write the contents of the EEPROM 32 from the outside of the discharge lamp lighting apparatus.

As a result of this, reading out of the various kinds of setting data from the EEPROM 32, while storing them within the EEPROM 32, by means of the calculation processing circuit 17, just after starting the operation of the discharge lamp lighting apparatus, enable an increase on the flexibility of the discharge lamp lighting apparatus. For example, in a case where it is necessary to drive the discharge lamps 13, each having different inverter frequency, the calculation processing circuit reads the values of the inverter frequencies therein from the EEPROM 32, and changes the value of the inverter frequency within the EEPROM 32 fitting to the discharge lamp 13, thereby it is possible to deal with it, without changing of the circuit thereof.

Although the EEPROM 32 is applied as the nonvolatile memory in the present embodiment mentioned above, however it should not be restricted only to this, but it is also possible to apply a flash ROM, for example, in the place thereof.

As was mentioned fully in the above, with the discharge lamp lighting apparatus according to the present invention, it is possible to obtain an effect that the calculation processing circuit can be protected from falling into the malfunction due to the noises. Also, with using the protection circuit together with the calculation processing circuit and the analog circuit in common, controlling the no-load voltage when the discharge lamp is in the open-circuit condition enables an improvement of the safety thereof. Further, with adding the superpose voltage having the width and the height, being in inverse relation to the increase/decrease of the output electric power, onto the output voltage of the AC converter circuit, it is possible to suppress the flicker of the discharge lamp.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A discharge lamp lighting apparatus, comprising:
   an output electric power controlling circuit for a discharge lamp;
   an output voltage detector which outputs a first detection result of an output voltage of said electric power controlling circuit;
   a driving current detector which outputs a second detection result of a discharge lamp driving current;
   a processor which controls said output electric power controlling circuit based upon said first detection result and said second result; and
   an electric power source which supplies electric power to said processor, wherein said processor stops operation at least during a predetermined time period after said discharge lamp starts lighting.

2. The discharge lamp lighting apparatus, according to claim 1, wherein the electric power source stops supply of electric power to said processor during said predetermined time period.

3. The discharge lamp lighting apparatus, according to claim 1, wherein said processor is built up with a microcomputer, and said microcomputer is brought into a sleep mode, at least during said predetermined time period.

4. The discharge lamp lighting apparatus, according to claim 1, further comprising:

an analog protection circuit which controls operation of said discharge lamp lighting apparatus based upon said first detection result; and an output current limit circuit for controlling an output current of said discharge based upon said second detection result, wherein said processor controls output electric power controlling circuit based upon said first detection result and said second detection result, and said analog protection circuit and said output current limit circuit control said output electric power controlling circuit when said processor malfunctions.

5. The discharge lamp lighting apparatus, according to claim 1, further comprising:

an output current limit current which controls said output voltage to be equal to or less than a predetermined value based upon said first detection result.

6. The discharge lamp lighting apparatus, as described in claim 1, further comprising:

a thermistor for detecting temperature, wherein supply of the electric power to said discharge lamp is stopped when said thermistor detects the temperature to be equal to or greater than a predetermined value until an electric power to said discharge lamp lighting apparatus is cut off.

7. The discharge lamp lighting apparatus, according to claim 1, wherein:

when the discharge lamp is shifted from a discharge lamp drive condition into a lamp light-out condition, the discharge lamp lighting apparatus passes through an ultra low electric power drive condition for driving the discharge lamp with an ultra low electric power, being equal to or less than 50% of that when it is driven normally; and a period for shifting from said discharge lamp drive condition into said ultra low electric power drive condition is equal to or less than 0.5 second.

8. The discharge lamp lighting apparatus, according to claim 7, wherein the discharge lamp is shifted into the lamp light-out condition after said ultra low electric power drive condition passes through a predetermined time period.

9. The discharge lamp lighting apparatus, according to claim 1, further comprising:

a nonvolatile memory, and wherein writing and reading of setting data to and from said nonvolatile memory are controlled from outside of said discharge lamp lighting apparatus via said processor.

10. A discharge lamp lighting apparatus, comprising:

an output electric power controlling circuit for a discharge lamp;

an output voltage detector which outputs a first detection result of an output voltage of said output electric power controlling circuit;

a driving current detector which outputs a second detection result of a discharge lamp diving current;

a processor which controls said output electric power controlling circuit based upon said first detection result and second detection result; and an analog protection circuit which controls operation of said discharge lamp lighting apparatus based upon said first detection result; and an output current limit circuit for controlling an output current of said discharge based upon said second detection result, wherein said processor controls said output electric power controlling circuit based upon said first detection result and said second detection result, and said analog protection circuit and said output current limit circuit control said output electric power controlling circuit when said processor malfunctions.

11. The discharge lamp lighting apparatus, according to claim 10, further comprising:

an output current limit circuit which controls said output voltage to be equal or less than a predetermined value based upon the first detection result of said output voltage detector.

12. The discharge lamp lighting apparatus, according to claim 10, further comprising:

a thermistor for detecting temperature, and wherein supply of the electric power to said discharge lamp is stopped when said thermistor detects the temperature to be equal to or greater than a predetermined value until an electric power to said discharge lamp lighting apparatus is cut off.

13. The discharge lamp lighting apparatus, according to claim 10, wherein:

when the discharge lamp is shifted from a discharge lamp drive condition into a lamp light-out condition, the discharge lamp lighting apparatus passes through an ultra low electric power drive condition for driving the discharge lamp with an ultra low electric power, being equal to or less than 50% of that when it is driving normally; and a period for shifting from said discharge lamp drive condition into said ultra low electric power drive condition is equal to or less than 0.5 second.

14. The discharge lamp lighting apparatus, according to claim 10, further comprising:

a nonvolatile memory, and wherein writing and reading of setting data to and from said nonvolatile memory is controlled from outside of discharge lamp lighting apparatus via said processor.

15. The discharge lamp lighting apparatus, according to claim 10, wherein said predetermined time period is a period when high voltage is supplied to said discharge lamp after said discharge lamp starts lighting.

* * * * *